United States Patent

[11] 3,581,790

[72] Inventor Mario Del Conte
 1860 E. 3rd St., Brooklyn, N.Y. 11223
[21] Appl. No. 835,036
[22] Filed June 20, 1969
[45] Patented June 1, 1971

[54] CHEESE GRATING DEVICE
 11 Claims, 6 Drawing Figs.
[52] U.S. Cl................................................ 146/177,
 146/61
[51] Int. Cl......................................................A23c 19/00,
 A47j 43/04
[50] Field of Search........................................... 146/177, 61

[56] References Cited
 UNITED STATES PATENTS
 1,661,076 2/1928 Maestro ........................ 146/174
 2,022,151 11/1935 Riddle............................ 146/177
 2,471,643 5/1949 Moran........................... 146/177

Primary Examiner—Willie G. Abercrombie
Attorney—Nicholas J. Garofalo

ABSTRACT: A hand held cheese grating device having a cylinder body fitted with a stationary lower grating member upon which a slug of cheese is rested and caused to be grated as an upper grating member is relatively rotated by means of a drive shaft. Cheese gratings fall through openings in the lower member and exit from the bottom of the cylinder. A compression spring constantly urges the upper member down upon the cheese. Any cheese gratings that might be forced upwardly through perforated grating formations to the upper surface of the upper member are swept over the edge of the latter to the openings in the lower member by means of a terminal arm of the spring, relative to which the upper member rotates. A container for receiving the cheese gratings is detachably mounted to the bottom of the device. The drive shaft is subject to manual or motorized operation.

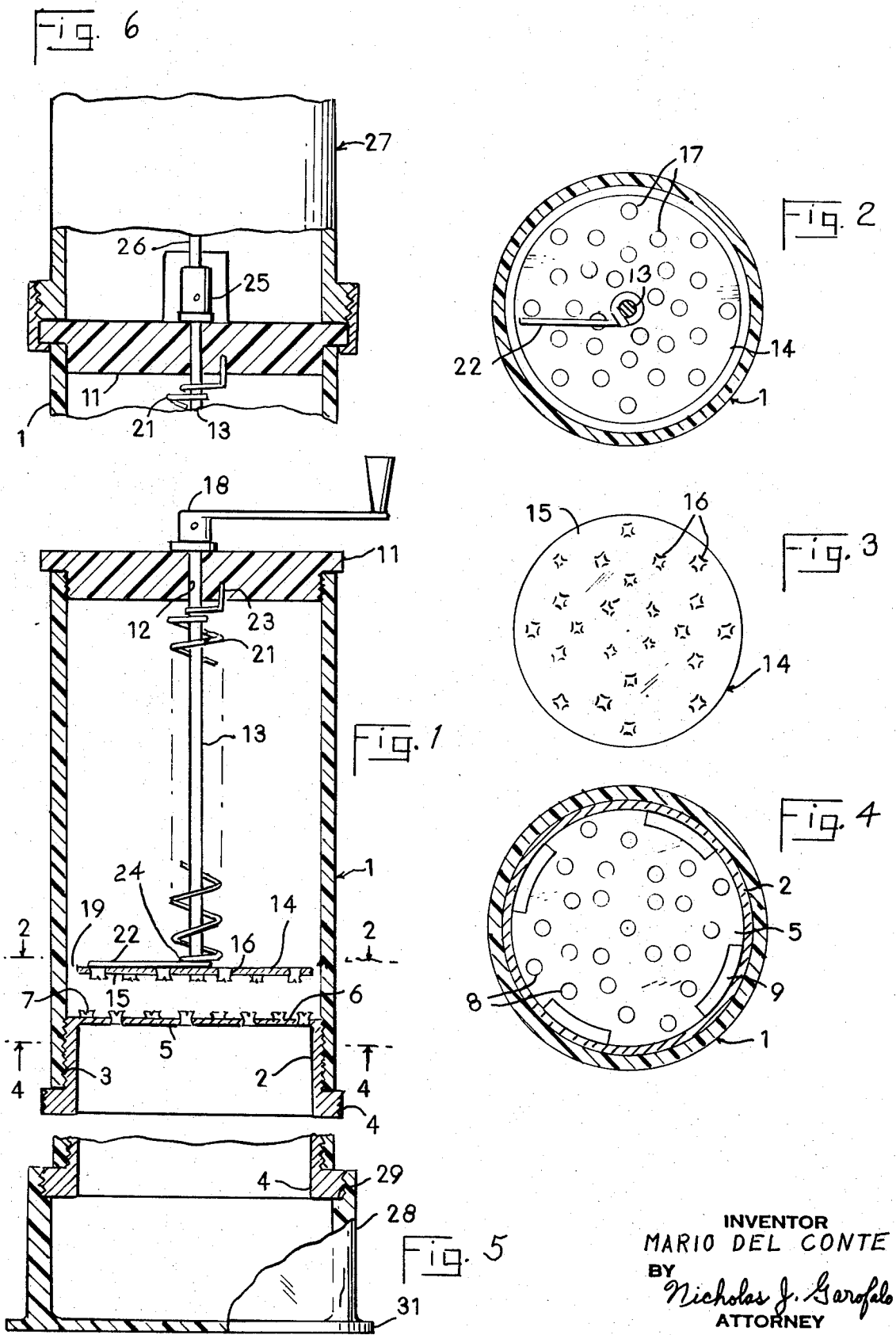

CHEESE GRATING DEVICE

BACKGROUND OF THE INVENTION

This invention relates to a cheese grating device in which a slug of cheese is disposable in a cylinder between an opposed pair of grating members one of which is stationary and the other of which is rotatable, whereby the cheese is subjected to a double grating action.

A feature of the device is the association of a compression spring and crankshaft with the rotatable grating member whereby the latter may be manually rotated and biased against the cheese.

A further feature of the device is a terminal arm of the spring which overlies the upper surface of the rotatable grating member and is adapted to sweep it clean of any cheese gratings that might accumulate thereon.

Another feature is a container removably attachable to the bottom of the device to receive the cheese gratings. It is of transparent material so that the operator may visibly determine when it is filled with cheese gratings.

Another feature of the device is its portable nature, whereby it may be held in one hand and operated with the other. The device may in one form employ a crank handle for its operation; and in another form may be motorized.

A particular advantage of the device lies in its capacity to be manually held selectively over a receiver or over a dish of food for disposition of the cheese gratings.

While the body of the device may be formed of various materials, it provides a particular advantage when made of transparent plastic, so that the grating operation may be visibly followed to determine when replacement of the slug of cheese is required.

BRIEF DESCRIPTION OF THE DRAWINGS

FIG. 1 is a vertical sectional view of a hand held cheese grating device embodying the invention;

FIG. 2 is a section on line 2-2 of FIG. 1;

FIG. 3 is a bottom plan detail of the upper grating member;

FIG. 4 is a section on line 4-4 of FIG. 1;

FIG. 5 is a modification of FIG. 1 showing a receiving cup removably attached to the bottom of the cylinder; and FIG. 6 is a modification of the upper portion of FIG. 1 in which the crank handle has been replaced by a motor drive.

DESCRIPTION OF A PREFERRED EMBODIMENT

Reference is now directed to the drawing wherein the cheese grating device is shown as including a cylinder body 1 having a cylindrical interior and open ends. A closure or lower cheese grating member 2 of crown form is threadedly engaged at 3 in the lower end of the cylinder. It has an external flange 4 abutting the bottom end of the cylinder. The flange extends radially beyond the cylinder to define a stable standing base for the device. The extended flange is adapted to be manually gripped when the lower member is threaded into or removed from the cylinder. The lower member has a recessed thin wall 5 which extends at right angles across the interior of the cylinder. The wall 5 is provided with a roughened upper surface 6 of conventional form for cheese grating purposes. The grating surface 6 is formed in conventional manner, as by perforating the wall 5 with a pointed tool through one face so as to cause on the opposite face raised sharp edges 7 about each of the perforations 8 to define the surface. A slug of cheese, not shown, is caused to be grated when it is rubbed over the grating surface. The grated cheese will fall through a series of enlarged openings 9 (FIG. 4) as well as through the perforations 8 and exit from the bottom of the cylinder.

A plug cap 11 is threadedly engaged in the top end of the cylinder. It has an axial hole 12, the wall of which provides a bearing surface for a crankshaft 13. The bottom end of the shaft is fixed axially to a thin upper grating member or disc 14, the underside of which has a grating surface 15 similar to and in opposed parallel relation to the lower grating surface 6. The upper grating surface is defined by the raised sharp edges 16 of a multiple number of small perforations 17.

The crankshaft 13 projects externally of the cap 11 and terminates in a crank handle 18. Rotation of the handle is transmitted through the shaft to the disc 14. The latter is smaller in diameter than the interior of the cylinder so as to provide a surrounding clearance 19. The cap 11 is axially thickened so as to provide a broad bearing surface for the crankshaft. This serves to center the shaft and the grating disc 14 in the cylinder, so that the disc is maintained at all times during rotation clear of the surrounding cylinder wall.

A compression spring 21 encircles the crankshaft, and is limited between the cap and the opposed surface of the grating disc. The spring normally holds the shaft and disc retracted inwardly of the cylinder to a normal position, as in FIG. 1, in which the crank handle 18 abuts the cap. When so retracted, the disc is located toward the bottom of the cylinder where it is spaced a little above the lower grating surface 6.

To use the device, its cap 11 is first unscrewed from the cylinder and then withdrawn as a unit with the crankshaft 13 and the grating disc 14. A slug of cheese, not shown, is then inserted in the cylinder and seated upon the lower grating surface 6. The cheese slug is preferably of reduced diameter relative to the grating surface 6 so that portions of the openings 9 about the marginal area of the lower grating member 2 would be exposed beyond the periphery of the cheese slug. The upper grating disc 14 is then reinserted into the cylinder above the cheese, and the cap is screwed back in position. As the cap is progressively entered into the cylinder, the spring 21 is compressed causing the grating disc to be pressed against the cheese slug.

Manual operation of the crankshaft 13 rotates the roughened surface of the grating disc 14 over the cheese. The grated cheese falls through the openings 9 and the perforations 8. Under the load of the spring the grating disc 14 follows the slug of cheese downwardly as the latter is reduced in size during the grating operation. During the grating action there is a tendency of the torque of the rotating upper grating member to be transmitted through the cheese to the lower grating member. The left-hand threaded connection 3 between the lower grating member and the cylinder serves to avoid loosening of the lower grating member in this action. At times during the grating operation the upper grating member will rotate the cheese slug relative to the lower grating member. When this occurs, the cheese slug will be grated as it moves over the grating surface of the lower grating member. Accordingly, it can be seen that the cheese is subjected to a double grating action, usually by the upper grating member, and at times by the lower grating member.

It can be seen with respect to the lower grating member that the grated cheese will fall largely through the large openings 9 and in a lesser degree through the small perforations 8. With respect to the upper grating disc member, some of the grated cheese will be forced upwardly through the small perforations 17 to the upper surface of the disc. To prevent this upwardly moving grated cheese from accumulating upon the upper surface of the disc 14, the spring is offset at its terminal portion to provide a sweeper arm 22. The spring has an upper terminal end 23 which is embedded in the cap 11 so as to prevent the spring from rotating as a unit with the disc 14. A lower portion of the spring loosely loops the crankshaft as at 24 so as not to interfere with relative rotation of the shaft, and then continues radially across the flat upper surface of the disc to the periphery of the latter to define the sweeper arm 22. It can be seen that as the disc is rotated by the crankshaft, it will rotate relative to the spring and to the sweeper arm. Cheese gratings rising to the upper surface of the disc will be forced or swept by the sweeper arm over the edge of the disc into the clearance 19 from where they will drop to the openings 9 in the lower grating member.

The device is relatively small. It is adapted when being used to be held vertically in the palm of one hand while the crankshaft is turned by the other hand. The bottom end of the device may be positioned over any suitable container to receive the cheese gratings; or it may be positioned so as to allow the gratings to drop directly upon a dish of food.

The cylinder 1 may be formed of various materials. Here, it is formed of transparent plastic. This provides a desirable advantage in that it affords the user a view of the grating operation and of the extent to which the slug of cheese has been reduced by the grating action.

In FIG. 6 a motorized form of the device is shown in which the crank handle 18 of FIG. 1 has been eliminated and the drive shaft 13 has been coupled as at 25 to the output shaft 26 of a motor 27. The latter is shown here as being of a type which is adapted to be held in the palm of the hand.

It is understandable that a cup or container, as indicated at 28 in FIG. 5, may be removably fitted over the bottom end of the cylinder to receive the cheese gratings. This container is formed preferably of transparent plastic so that the user can readily see when it has become filled with cheese gratings. Here, it is threadedly engaged with the flange 4, and it has an internal shoulder 29 abutting the bottom of the flange. A broad base 31 of the container serves to prevent tipping of the device when the latter is rested upon a table surface.

I claim:

1. A hand held cheese grating device containing an open-ended cylinder adapted to receive through one of its ends a slug of cheese, a lower grating member and an upper grating member disposed in the cylinder respectively defining a lower cheese grating surface and an opposed parallel upper cheese grating surface, the lower member being stationary and having a group of holes through which gratings of cheese may pass, the upper member being rotatable and axially retractible relative to the lower member, a cap closing over the upper end of the cylinder having an axial bore, a drive shaft fixed at its bottom axially to the upper member and projecting in its upper portion slidably through the bore in the cap, means externally of the cap for rotating the shaft, a compression spring loosely encircling the shaft and limited between the cap and the upper member, the spring constantly urging the upper member together with the shaft axially inwardly of the cylinder, an external abutment on the shaft having cooperation with the cap to limit the extent of inward disposition of the shaft and upper member to a position in which the upper member is spaced a predetermined normal clearance above the lower member, the upper member and shaft being axially retractible against the bias of the spring to the extent of the axial dimension of a slug of cheese that might have been entered into the cylinder above the lower member.

2. A hand held cheese grating device as in claim 1, wherein the upper member is a disc having a plurality of perforations about each of which at the underside of the disc depend sharp edges defining the upper grating surface.

3. A hand held cheese grating device as in claim 2, wherein a clearance spaces the periphery of the disc from the surrounding wall of the cylinder so as to allow gratings of cheese to drop over the edge of the disc and through the clearance to the holes in the lower member.

4. A hand held cheese grating device as in claim 1, wherein one end of the spring is fixed in the cap, and an opposite end of the spring extends radially across the upper surface of the disc to define a sweeper arm relative to which the disc is rotatable by the shaft.

5. A hand held cheese grating device as in claim 4, wherein a manipulative crank handle is provided on the shaft externally of the cap.

6. A hand held cheese grating device as in claim 4, wherein a coupling drivingly connects a motor with the shaft, and coupling means mounts the housing of the motor with the cylinder.

7. A hand held cheese grating device as in claim 1, wherein a container is detachably mounted over the bottom end of the cylinder for reception of any cheese gratings that might fall through the holes in the lower member.

8. A hand held cheese grating device as in claim 7, wherein the container is formed of transparent material so that it may be visibly determined when the container is filled with cheese gratings.

9. A hand held cheese grating device as in claim 7, wherein the container has a broad bottom providing a stable standing base for the device.

10. A hand held cheese grating device as in claim 7, wherein the cylinder is formed of transparent material so that it may readily be determined when a slug of cheese entered into the cylinder has been grated down to a size requiring replacement.

11. A cheese grating device containing an open-ended cylinder adapted to receive through one of its ends a slug of cheese, a lower grating member and an upper grating member disposed in the cylinder respectively defining a lower cheese grating surface and an opposed parallel upper cheese grating surface, the lower member being stationary and having a group of holes through which gratings of cheese may pass, the upper member being rotatable and axially retractible relative to the lower member, a cap closing over the upper end of the cylinder having an axial bore, a drive shaft fixed at its bottom axially to the upper member and projecting in its upper portion slidably through the bore in the cap, means externally of the cap for rotating the shaft, a compression spring loosely encircling the shaft and limited between the cap and the upper member, the spring constantly urging the upper member together with the shaft axially inwardly of the cylinder, an external abutment on the shaft having cooperation with the cap to limit the extent of inward disposition of the shaft and upper member to a position in which the upper member is spaced a predetermined normal clearance above the lower member, the upper member and shaft being axially retractible against the bias of the spring to the extent of the axial dimension of a slug of cheese that might have been entered into the cylinder above the lower member.